United States Patent
Bushkov et al.

(10) Patent No.: US 9,346,033 B2
(45) Date of Patent: May 24, 2016

(54) GAS-LIQUID REACTOR

(71) Applicant: Public Joint Stock Company "SIBUR Holding", stroenie (RU)

(72) Inventors: Vladimir Vladimirovich Bushkov, Tomsk (RU); Vladislav Sergeevich Stankevich, Tomsk (RU)

(73) Assignee: Public Joint Stock Company "Sibur Holding", Tobolsk (RU)

( * ) Notice: Subject to any disclaimer, the term of this patent is extended or adjusted under 35 U.S.C. 154(b) by 0 days.

(21) Appl. No.: 14/406,090

(22) PCT Filed: Jun. 5, 2013

(86) PCT No.: PCT/RU2013/000458
§ 371 (c)(1),
(2) Date: Dec. 5, 2014

(87) PCT Pub. No.: WO2013/184034
PCT Pub. Date: Dec. 12, 2013

(65) Prior Publication Data
US 2015/0231596 A1     Aug. 20, 2015

(30) Foreign Application Priority Data

Jun. 6, 2012   (RU) .................................. 2012123526

(51) Int. Cl.
*B01J 19/24*  (2006.01)
*B01J 10/00*  (2006.01)
*B01J 19/00*  (2006.01)

(52) U.S. Cl.
CPC .............. *B01J 19/2425* (2013.01); *B01J 10/00* (2013.01); *B01J 19/006* (2013.01); *B01J 2219/00166* (2013.01); *B01J 2219/00777* (2013.01); *B01J 2219/2401* (2013.01)

(58) Field of Classification Search
CPC ...... B01J 10/00; B01J 10/007; B01J 19/2425; B01J 19/2415; B01J 19/006; B01J 2219/00166; B01J 2219/00777; B01J 2219/2401
See application file for complete search history.

(56) References Cited

U.S. PATENT DOCUMENTS 3,230,055 A * 1/1966 Wolfrom ............. B01F 3/04503
                                                          261/153
3,417,967 A * 12/1968 Richens et al. ....... B01F 5/0604
                                                          366/144

(Continued)

FOREIGN PATENT DOCUMENTS

BY            6340 C1      6/2004
CN        2145639 Y       11/1993

(Continued)

OTHER PUBLICATIONS

International Search Report mailed Dec. 5, 2013 in counterpart International Application No. PCT/RU2013/000458.

(Continued)

*Primary Examiner* — Lessanework Seifu
(74) *Attorney, Agent, or Firm* — Banner & Witcoff, Ltd.

(57) ABSTRACT

A gas-liquid reactor for gas-liquid contacting processes can be used in the chemical, petrochemical and other industries, with an advantageous target product output and a plug flow regime. The reactor comprises a housing with an inlet and an outlet for the introduction of reagents and the removal of reaction products. The reactor housing contains a pipe bundle situated such that the space between the pipes does not communicate with the internal volume of the pipes. The reactor housing is also provided with input and output pipes which communicate with the space between the pipes for the supply of a coolant or heat-carrier. A rod is removably installed in at least one of the pipes. Plates are attached to the rod, each of the plates has at least one opening. The plates are arranged in such a way that the openings of neighboring plates are not coaxial in relation to one another.

3 Claims, 1 Drawing Sheet

(56) References Cited

U.S. PATENT DOCUMENTS

Figures 1, 2:
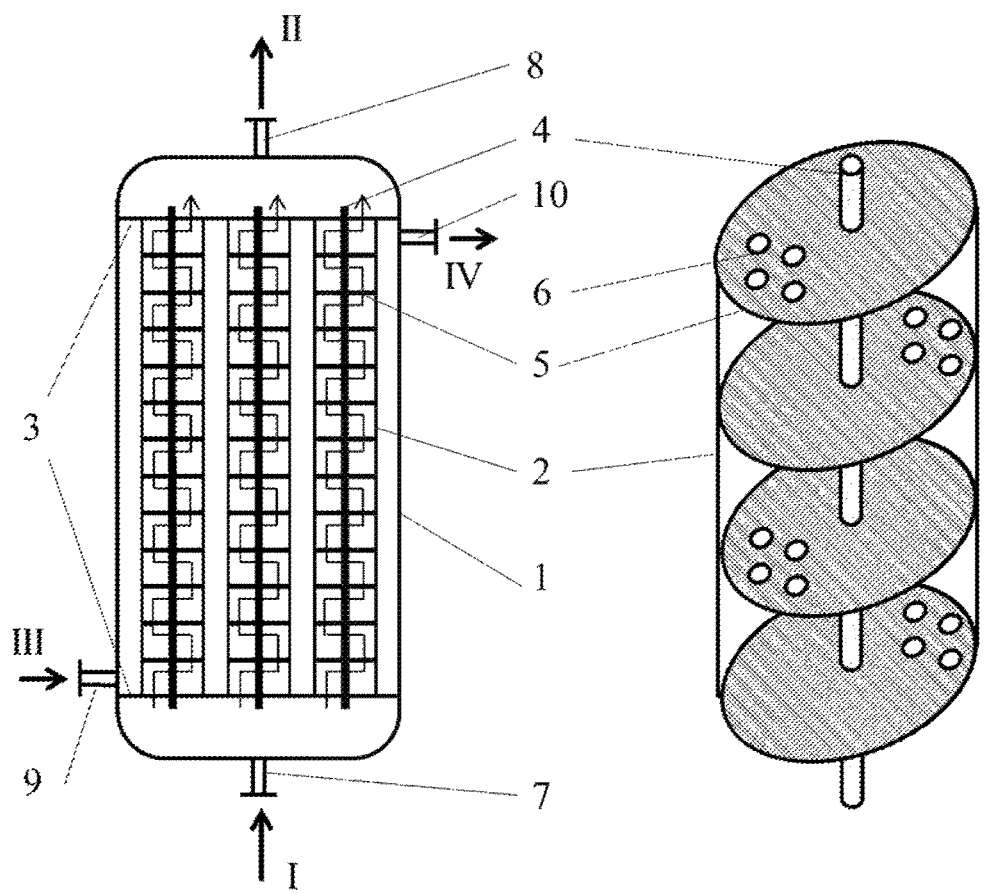

| | | | |
|---|---|---|---|
| 6,120,740 A | 9/2000 | Zardi et al. | |
| 6,444,180 B1 | 9/2002 | Zardi et al. | |
| 6,451,268 B1 | 9/2002 | Erdman | |
| 2004/0120877 A1* | 6/2004 | Satchell, Jr. | B01F 5/106 423/406 |
| 2004/0241059 A1 | 12/2004 | Seidlitz et al. | |

FOREIGN PATENT DOCUMENTS

| | | |
|---|---|---|
| CN | 1147772 A | 4/1997 |
| CN | 1348429 A | 5/2002 |
| CN | 2937121 Y | 8/2007 |
| DE | 19801705 A1 | 7/1999 |
| EP | 1175930 A1 | 1/2002 |
| EP | 1849509 A1 | 10/2007 |
| RU | 2102105 C1 | 1/1998 |
| RU | 2142334 C1 | 12/1999 |
| RU | 2230593 C2 | 7/2000 |

OTHER PUBLICATIONS

Sep. 6, 2015 (CN) Office Action—Chinese application No. 201380030122.9.

* cited by examiner

GAS-LIQUID REACTOR

CROSS-REFERENCE TO RELATED APPLICATIONS

This application is a U.S. National Stage application under 35 U.S.C. §371 of International Application PCT/RU2013/000458 (published as WO 2013/184034 A2), filed Jun. 5, 2013, which claims priority to Application RU 2012123526, filed Jun. 6, 2012. Benefit of the filing date of each of these prior applications is hereby claimed. Each of these prior applications is hereby incorporated by reference in its entirety.

The invention relates to the field of technological equipment for carrying out gas-liquid processes and can be used in chemical, petrochemical and other industries.

The distinctive property of gas-liquid catalytic processes in most cases is that the reaction proceeds in liquid phase, wherein one of reagents is liquid and another one is a gas dissolved in liquid. Chemical reaction between liquid and gas in liquid phase leads to occurrence of a stage of transition of one of reagents from gas phase into solution. This, in turn, leads to the fact that process rate often depends on dissolution rate of the gas as limiting stage which is an evidence of process proceeding in a diffusion area.

Presence of a diffusion area as a rule negatively affects the process rate and target product output. A necessity of carrying out a chemical process in kinetic area leads to search for a reactor structure suitable for solving the present problem. Process proceeding in kinetic area can be provided by achievement of a high dissolution rate of gaseous reagent in a liquid, the value of which directly depends on contact time according to gas phase. The higher the contact time according to gas phase the faster the gas dissolution in liquid would proceed. Therefore, increasing contact time according to gas phase is one of the main problems in increasing efficiency of gas-liquid reactor operation [Timonin A. S. Machines and devices of chemical industries. Kaluga, Publ. N. F. Bochkareva, 2008-872 p.].

The most efficient method for increasing contact time is increase in length of a path which is passed by gas or liquid from the reagent feed point to target product output point. Thus, U.S. Pat. No. 7,387,769 discloses a structure of a reactor consisting of a plurality of sections serially connected to each other with openings located alternately below and above the section. Liquid in this reactor moves horizontally from one section to another in a serpentine path. Gas is dosed in each chamber separately. This reactor is used for preparing precipitated calcium carbonate by reacting carbon dioxide with calcium hydroxide solution. Disadvantage of this structure is a horizontal movement of gas and liquid which is unacceptable for many chemical processes, in particular, for a process of preparing 1-hexene from ethylene since in this case gas would accumulate in the upper part of the apparatus with formation of gas-filled areas. Gas accumulation in some places would lead to decrease in contact surface between liquid and gas phases which would negatively affect gas dissolution rate in liquid.

There is a reactor for carrying out gas-liquid chemical processes which we have selected as a prior art [U.S. Pat. No. 6,444,180]. The main feature of structure in this reactor is the use of perforated plates having an aperture located near the edge of the plate made in the form of a circle segment and adjacent to the inner surface of reactor shell. Wherein the plates are alternated pairwise so that the segmental apertures would be located at different sides of reactor central axis thus providing movement of a liquid phase in a zigzag trajectory. Due to this interfacial area is increased and better mixing of liquid and gas phase between each other is provided, which leads to increase in target product output.

An integral part of the aforementioned invention is use of perforated plates which provide a vertical movement of gas phase. Wherein it should be noted that irrespective of the method of arrangement of the side apertures in plates (two apertures in each plate, one aperture or no apertures) the movement of the gas phase would be vertical through perforated openings in the central part of the plates. In accordance with such flow organization the use of the invention only increases the contact time according to liquid phase and does not affect the time contact according to gas phase.

For many gas-liquid processes in chemical and petrochemical industries including the processes for preparing 2-ethylhexanoic acid from 2-ethylhexanal and 1-hexene from ethylene, the contact time according to gas phase is the most important parameter defining output of the target product formed in the reactor. E.g. in the process for preparing 2-ethylhexanoic acid from 2-ethylhexanal target, the product formation rate depends on concentration of dissolved oxygen. In its turn, concentration of dissolved oxygen is defined by an equilibrium which is formed between the dissolved oxygen and the oxygen in the gas phase. In case of insufficient time of contact of liquid with gas the oxygen dissolution rate would be lower than the reaction rate of the dissolved oxygen with aldehyde. In this case the process would proceed in a diffusion area which would negatively affect the target product output. Making a relatively high value for contact time according to gas phase would facilitate increase in oxygen dissolution rate and transition of the process into a kinetic area.

At the predetermined gas and liquid flows the value of contact time according to gas phase would be defined by the value of gas content in the apparatus. The higher the gas content the higher the value of contact time according to gas phase and the higher would be the rate of gas dissolution in liquid. Increase in gas content can be achieved in two ways. First of all, due to increase of the amount of the fed gas together with simultaneous increase in apparatus volume. Such an approach is linked to significant capital costs and leads to an ineffective use of main equipment, in particular, gas-liquid reactor [Lehtinen C., Brunov G. Factors affecting the Selectivity of Air Oxidation of 2-Ethylhexanal, an [α]-Branched Aliphatic Aldehyde. Org. Proc. Res. & Dev., 2000, 4(6), pp. 544-549].

Another approach lies in providing such a reactor structure which would provide maximal increase in length of the path passed by gas from reactor feed point to final product exit point. In this case it is possible to increase volume of gas present in the reactor without changing the dimensions of reactor itself but only by means of amending inner design of the apparatus. The reactor design claimes in U.S. Pat. No. 6,444,180 solves the problem of increasing target product output, in particular, for a process of preparing urea but does it due to the increase of contact time according to liquid phase. Use of such design for processes in which the limiting stage is transition of one of reagents from the gas phase to solution (in particular, dissolution of oxygen while preparing 2-ethylhexanoic acid and dissolution of ethylene while preparing 1-hexene) does not allow achieving the analogous increase in target product output since the contact time according to gas phase remains unchanged.

Another problem which emerges while carrying out gas-liquid processes including preparing 2-ethylhexanoic acid from 2-ethylhexanal and 1-hexene from ethylene is a necessity of withdrawal of large amount of heat evolved as a result of the chemical reaction. Calculation of reactor thermal balance shows that in order to provide efficient withdrawal of heat of chemical reaction it is necessary a significant heat exchange surface which can be achieved only by using a bundle of tubes incorporated into the reactor with cooling agent supply into tube space between pipes. At the same time use of a jacket appears to be insufficient for effective withdrawal of heat of chemical reaction.

Design described in the prototype can be used only in reactors in which heating/cooling of the reaction mass is carried out via jacket. Therefore we come to a conclusion that reactor design proposed in U.S. Pat. No. 6,444,180 is not suitable for gas-liquid processes accompanied by high evolution of heat of chemical reaction due to impossibility of arranging a tube bundle inside the reactor.

The aim of the present invention is to develop a reactor design allowing to increase the efficiency of gas-liquid chemical processes.

Technical result (effect) lies in the fact that this solution provides maximum target product output and a plug flow regime. Another technical result (effect) lies in increase of convenience in using and maintaining the reactor which allows to operative control the reaction process and carry it out under optimal conditions by changing its construction during for several hours. Also, the technical result (effect) lies in the fact that the invention makes it possible to evaluate, during the development stage and with high accuracy, the geometrical parameters of the reactor and the effects thereof on the speed of the chemical process and the output of target product. A further technical result (effect) lies in the fact that this solution provides effective maintaining of isothermal regime with constant elevated or lowered temperature.

Solution of the problem and technical result is achieved due to the fact that in order to carry out the gas-liquid processes the gas-liquid reactor is used with a special inner structure (design). The structure is shown in FIG. 1.

The gas-liquid reactor comprises housing with pipes for the introduction of reagents (7) and the removal of reaction products (8). The reactor housing (1) contains a pipe bundle (2) attached to the pipe array (3) from above and from below in such a way that the space between the pipes does not communicate with the internal volume of said pipes. The reactor housing is also provided with input (9) and output (10) pipes which communicate with the space between the pipes in which a coolant or heat-carrier are correspondingly supplied for heat withdrawal from chemical reaction or heating up the reaction mass if necessary.

A rod with a possibility of removal (4) is located inside at least of one of the pipes. Plates (5) are attached to the rod, each of which plates has at least one opening (6). The openings preferably but optionally are arranged close to the edge of the plate. The plates are arranged in such a way that the openings of neighboring plates are not coaxial in relation to one another. It is preferable, that the openings of pairwise neighboring plates are arranged at diametrically opposite points with respect to rod. Structure (design) of one of such tubes is shown in FIG. 2. The rod can be fixed within a pipe by any known method providing a possibility of removal, e.g. by a threaded or riveted connection. The plates are fixed along rod height, wherein any fixing method being able to be selected which allows changing the distance between plates, e.g. by nuts, if necessary, with further use of washer.

In order to carry out the process the reagents are supplied via the feedstock introduction connecting pipe (stream I) into the reactor. Wherein gaseous components can be supplied both together with liquid phase and separately. The chemical reaction is carried out in the tube side, wherein the gas-liquid stream moving upwards in the tubes. In case of non-coaxial arrangement of openings in the plates, elongation of reaction mass movement trajectory is provided in comparison with the shortest trajectory from the reagent feed point to the target product output point. This leads to increase length of the path passed by the gas from the reagent feed point (stream I) to the target product output point (stream II). Increase of a path passed by gas in its turn leads to an increase in gas phase volume in the reactor and, as a consequence, to increase in contact time according to gas phase. This provides for achieving the maximum target product output due to the process proceeding in kinetic area when process rate is not limited by gas dissolution rate in liquid but defined only by chemical reaction rate.

In view of the fact that chemical reaction proceeds in the tube side which does not communicate with the space between pipes, the latter can be used for supplying a coolant or heat-carrier therein. In this case the heat exchange surface significantly increases compared to reactors in which cooling/heating is carried out via jacket due to use of the surface of all pipes, not only the reactor shell. Heat exchange surface can be adjusted by arranging a various number of tubes inside the reactor which provides additional possibilities while selecting the apparatus structure at the development stage. Therefore, an effective maintaining of isothermal regime with constant elevated or lowered temperature is provided due to high heat transfer rate and possibility for varying thereof at apparatus development stage.

At development of chemical reactors including reactors for carrying out gas-liquid processes one of the most important problems at the stage of composing a mathematical model of the apparatus is the most precise assessment of influence of the reactor structure on the process rate and target product output. Very often in order to avoid mistakes in defining the required reactor size the designers have to increase the required reactor dimensions which leads to increase in reactor cost. Due to possibility of predicting the movement trajectory of gas-liquid mixture along the tube with shelves the structure proposed in the invention allows calculating reactor geometric parameters with high precision including pipe number and pipe diameter, number of shelves and distance between them. In case of discrepancy between experimental data with calculated ones, the use of the present structure allows to easy remove the existing errors immediately after test start of the reactor by changing number of pipes containing the rod and also by adding or removing plates on the rod and changing the distance between them. Therefore, it is provided a possibility to assess, during the development stage and with high accuracy, the geometrical parameters of the reactor and the effects thereof on the speed of the chemical process and the output of target product.

Number of pipes containing the rod and also distance between the plates and number of plates fixed on the rod can be changed both at the reactor development stage and during reactor operation depending on alteration of process conditions (reagent flow rate, pressure, temperature). In particular, while increasing reactor output it is necessary to increase reagent residence time in the apparatus which is easily achieved by lowering the distance between plates and increase of their number. Technically this operation can be carried out at any moment including during reactor operation by removing anchor rods with fixed plates and moving the plates along the rod with addition of new ones. Therefore, it is provided a possibility for controlling the process and carrying it out under optimal conditions without replacement of the whole reactor but only by a simple alteration of its structure, which can be easily realized during several hours.

The reactor structure proposed in the invention can be selected not only during the stage of developing the new apparatus. This structure can be also used for improving the reactor equipment already present by placing analogous tubes within the reactor volume. Foe example, a process of oxidizing 2-ethylhexanal to 2-ethylhexanoic acid is realized in a hollow reactor with a built-in coil pipe. There is a possibility of placing tubes with anchor rods proposed in the invention inside of the apparatus between the coil pipe turns. In this case chemical reaction would proceed not in the space between the pipes, but in tube side, wherein the contact time according to gas phase being increased which would allow transferring the process from diffusion area to kinetic one. Therefore a possibility appears for improving the existing gas-liquid reactors in which the process proceeds in diffusion area due to low value of contact time according to gas phase.

EXAMPLE 1

Production of hexene-1 from ethylene is carried out in reactor having the structure (design) proposed in the present invention. A three-section reactor is used for this with ethylene supplied in each chamber. Each chamber comprises a bundle of 50 pipes having 40 mm in diameter, in which the chemical reaction proceeds. In each pipe an anchor rod with plates fixed by nuts is located. One opening of 4 mm in diameter is made in each plate, wherein the plates alternate in such a way so the openings in adjacent plates are located at diametrically opposite points from the anchor central axis. In the first reactor section the pipes comprise 39 plates, in second one 26 plates, in third one—20 plates. Total length of reactor pipe part is 2.1 m. Heat exchange surface area is 13 $m^2$. Contact time according to gas phase is 3 min. Wherein a conversion of ethylene to hexene-1 of 98.3% is achieved. All other values being equal, the reactor being patented has smaller sizes and has a higher specific output. The data output obtained are outlined in Table 1.

EXAMPLE 2

An experiment in oxidizing 2-ethylhexanal, which is contained in the C8-aldehydes hydrogenate, to 2-ethylhexanoic acid is carried out during 4 hours in a dynamic laboratory reactor with internal coil pipe modeling an operated industrial apparatus at $1:0.9 \cdot 10^{-5}$ scale at a temperature of 45° C., air pressure of 1 atm, volume rate of hydrogenate feed of 0.45 $cm^3$/min and air feed of 235 $cm^3$/min providing a constant molar ratio of oxygen reagents: 2-EHA=1.5:1.

EXAMPLE 3

A comparative experiment is carried out in a flow glass reactor of the same sizes and under the same conditions as in Example 2 with the only difference being that structure of this reactor corresponds to the claimed invention. The obtained stationary output parameters of a non-catalytic process of liquid-phase oxidizing 2-ethylhexanal in laboratory and industrial method and also in Examples 2 and 3 are outlined in Table 2.

TABLE 1

| Compared reactors 1 | Structural type 2 | Process conditions ||||| Output parameters |||
|---|---|---|---|---|---|---|---|---|
| | | t, ° C. 3 | P of the gas, atm 4 | Reaction zone volume, l 5 | | Ethylene conversion, % 6 | Hexene-1 selectivity, % 7 | Specific output, g/l · h 8 |
| Laboratory | Bubbler in thermostat | 65 | 16 | 250 | | 98.2 | 90.3 | 160.0 |
| Patent-pending | Flow through bubble | 65 | 16 | 130 | | 98.3 | 90.3 | 307.7 |

TABLE 2

| | | | | | | | | Stationary output parameters ||||
|---|---|---|---|---|---|---|---|---|---|---|---|
| Compared reactors 1 | Reactor type according to operation mode 2 | Reactor for non-catalytic liquid phase oxidation of 2-EH to 2-EHA 3 | t, ° C. 4 | P of the gas, atm. 5 | Molar ration $O_2$:2-EH 6 | Solvent or catalyst 7 | Oxidizing gas 8 | 2-EH conversion, % 9 | 2-EHA selectivity, % 10 | 2-EHA output, % 11 | Reactor specific output according to 2-EHA, g/l · h 12 |
| Laboratory | static | bubbler in thermostat | 20 | 1 | 1.1:1 | none | air | 96.5 | 83 | 80.1 | 179.4 |
| Laboratory | static | bubbler in thermostat | 60 | 1 | 1.1:1 | none | air | 85.7 | 44 | 37.7 | 84.4 |
| Laboratory | static | bubbler in thermostat | 20 | 1 | 1.1:1 | Ethyl acetate | 100% $O_2$ | 94.1 | 78 | 68.5 | 153.4 |
| Laboratory | static | bubbler in thermostat | 20 | 1 | 1.1:1 | Mn(Ac)$_2$ catalyst | 100% $O_2$ | 98.5 | 84 | 82.7 | 185.2 |
| Industrial | flow | Bubbler with 5 inner coiled pipes | 42-65 | 3.75 | 1.28:1 | n-butyl butyrate and other impurities | air | 76.4 | 82.0 | 62.8 | 64.3 |
| Model (Example 2) | Flow | Bubbler with one inner coiled pipe | 45 | 1 | 1.5:1 | n-butyl butyrate and other impurities | air | 50.8 | 89.3 | 45.4 | 94.1 |

TABLE 2-continued

| | | | | | | | | | | | Stationary output parameters | |
| --- | --- | --- | --- | --- | --- | --- | --- | --- | --- | --- | --- | --- |
| Compared reactors 1 | Reactor type according to operation mode 2 | Reactor for non-catalytic liquid phase oxidation of 2-EH to 2-EHA 3 | t, °C. 4 | P of the gas, atm. 5 | Molar ration O$_2$:2-EH 6 | Solvent or catalyst 7 | Oxidizing gas 8 | 2-EH conversion, % 9 | 2-EHA selectivity, % 10 | 2-EHA output, % 11 | Reactor specific output according to 2-EHA, g/l · h 12 |
| Patented (Example 3) | Flow | 6-shelved with thermostatic jacket | 45 | 1 | 1.5:1 | n-butyl butyrate and other impurities | air | 81.5 | 87.8 | 71.5 | 137 |
| -//- | Flow | -//- | -//- | 3.75 | -//- | -//- | | 83.2 | -//- | 94.8 | 181.6 (calculated) |

The invention claimed is:

1. A gas-liquid reactor comprising a housing with an inlet for introduction of reagents and an outlet for removal of reaction products, plates each having at least one peripheral opening, wherein the plates are located in such a way so the peripheral openings of neighboring plates are not coaxial in relation to one another, wherein a pipe bundle is located in the reactor housing, wherein pipes of the pipe bundle are attached at their upper and lower ends to a pipe array such that the lower ends of the pipes of the pipe bundle communicate with the inlet and the upper ends of the pipes of the pipe bundle communicate with the outlet and space between the pipes of the pipe bundle does not communicate with the internal volume of the pipes of the pipe bundle, a rod being removably located in at least one of the pipes of the pipe bundle, wherein the plates are attached to the rod.

2. The gas-liquid reactor of claim 1 characterized in that the reactor housing contains input and output pipes for a coolant or heat-carrier, wherein the input and output pipes communicate with a space between the pipes.

3. The gas-liquid reactor of claim 1 characterized in that the rod has a thread for fixing the plates.

* * * * *